(No Model.)
P. MILLER.
DEVICE FOR FELLING TREES.
No. 308,187. Patented Nov. 18, 1884.
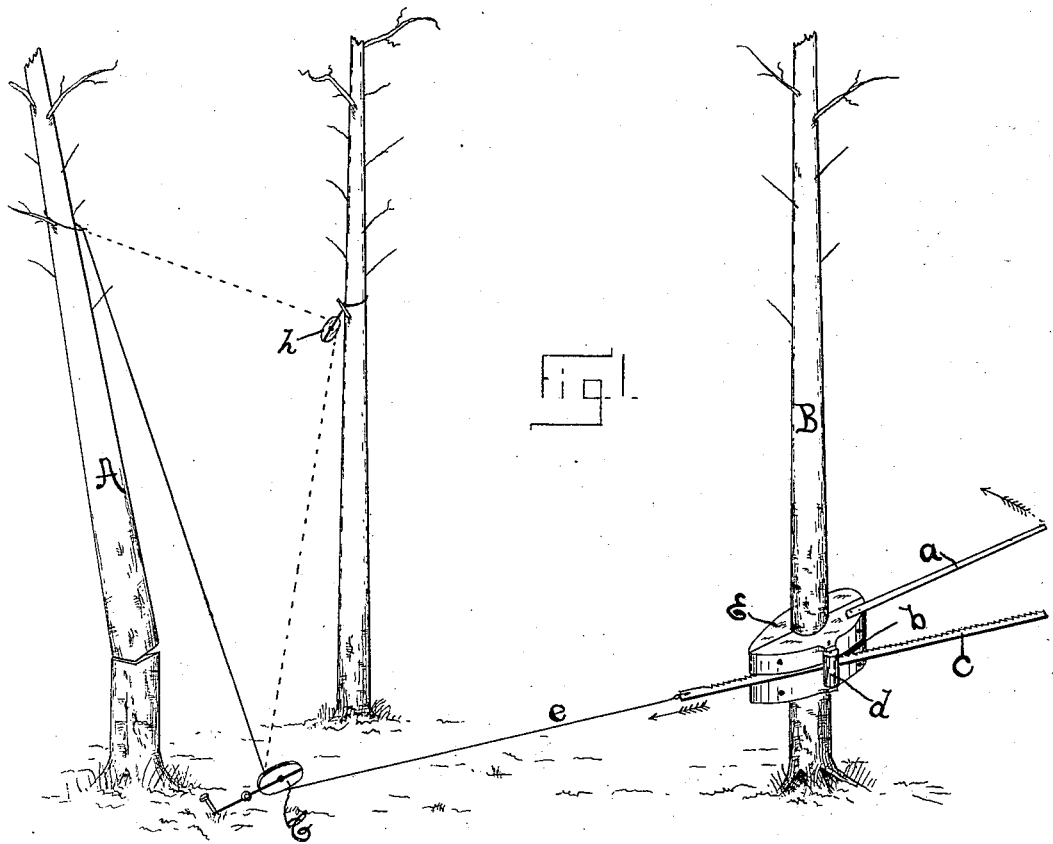
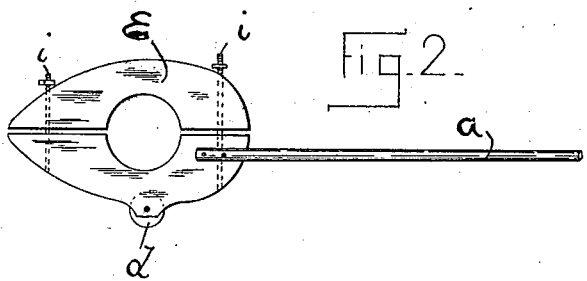
Witnesses
Donal G. Perkins
H. J. Battin
Inventor
Philip Miller
By his Attorney
Frank H. Allen

UNITED STATES PATENT OFFICE.

PHILIP MILLER, OF NORWICH, CONNECTICUT.

DEVICE FOR FELLING TREES.

SPECIFICATION forming part of Letters Patent No. 308,187, dated November 18, 1884.

Application filed August 8, 1884. (No model.)

*To all whom it may concern:*

Be it known that I, PHILIP MILLER, of the city of Norwich, county of New London, and State of Connecticut, have invented certain new and useful Improvements in Devices for and Methods of Felling Trees, which improvements are fully set forth and described in the following specification, reference being had to the drawings which form a part of and accompany said specification.

My improvements relate to a new method of felling forest trees and to certain simple mechanical devices which I use to accomplish the desired result, as hereinafter fully described, my immediate object being to utilize the power and motion of a falling tree to saw off, or partially saw off, another tree, which in turn furnishes the power necessary to saw off a third tree, and so on until the desired number of trees have been dropped.

In the accompanying drawings, Figure 1 is a general view of my new device as it appears in use in the forest. Fig. 2 is an enlarged top view of the clamp E.
The letter A represents a tree which has been sawed in two and is in the act of falling.

B represents a tree which is to be partially sawed off by the falling of tree A. Near the base of tree A is a pulley-block, C, which is secured to a stake or tree or otherwise anchored in a given position.

Located at the point where it is desired to saw off tree B is a clamp, E, formed in two parts, substantially as shown, and so secured that it may, when screwed home, clasp the tree firmly enough to prevent its slipping down, yet not so rigidly but that it may be partially rotated on said tree by means of a lever-arm, $a$, attached to clamp E. Clamp E is provided with a groove, $b$, reaching to or past the center of the tree, and of such width that it may receive and guide a saw-blade, $c$. At the outer edge of slot $b$ is a friction-roll, $d$, against which rests the back of saw $c$.
Attached to the end of saw $c$ is a rope, $e$, of wire, manilla, or other suitable material, which, passing through the pulley-block C, is secured at its other end to the tree A at a point well up on the trunk of said tree, preferably among its branches. It will now be evident that as tree A falls to the ground the rope $e$ will be rapidly and forcibly drawn forward through the pulley-block C, carrying with it the saw $c$, which is thus drawn rapidly across the trunk of tree B. By moving the lever-arm $a$ in the direction indicated by the arrow 1, the friction-roll $d$ acts to crowd saw $c$ against tree B, causing said saw to cut its way rapidly into said tree. The saw $c$ should be of such length that the full length of stroke given to the rope $e$ by the falling tree may be utilized. The distance traveled by rope $e$ and saw $c$ may be increased somewhat by attaching a pulley-block to the upper portion of a tree adjoining tree A, as at $h$, and passing the rope through said pulley-block and thence to pulley-block C, as indicated by dotted lines in Fig. 1. The length of stroke in such a case would be sufficient to saw tree B nearly through, the unsawed portion being sufficient to support said tree while removing clamp E and saw $c$ and attaching them to the tree which is to be next sawed; or, if preferred, tree B may be supported by props or guys until about to be dropped.

It will be readily seen that the entire apparatus made use of is cheaply and easily produced, and can be used by a person of ordinary intelligence.

The two-part clamp E may be held together by bolts $i$, as in Fig. 2, or by any other simple and strong means.

Having thus described my invention, I claim—

The method herein described of utilizing the momentum of a falling tree to partially or wholly saw an adjacent tree, which consists in holding the saw-edge against the tree to be cut and connecting said saw by block and tackle or other suitable means to a falling tree, whereby the momentum of the falling tree will rapidly draw the saw-edge into the tree against which it is held, substantially as described, and for the purposes set forth.

PHILIP MILLER. [L. S.]

Witnesses:
   H. M. KNAPP,
   ABRAHAM F. BOYER.